United States Patent
Adams et al.

(10) Patent No.: US 11,386,229 B2
(45) Date of Patent: Jul. 12, 2022

(54) FILTERING PERSONALLY IDENTIFIABLE INFORMATION FROM VEHICLE DATA

(71) Applicant: BlackBerry Limited, Waterloo (CA)

(72) Inventors: Neil Patrick Adams, Waterloo (CA); Jasmin Mulaosmanovic, Waterloo (CA); Robert Joseph Lombardi, Waterloo (CA)

(73) Assignee: BlackBerry Limited, Waterloo (CA)

( * ) Notice: Subject to any disclaimer, the term of this patent is extended or adjusted under 35 U.S.C. 154(b) by 145 days.

(21) Appl. No.: 16/503,596

(22) Filed: Jul. 4, 2019

(65) Prior Publication Data
US 2021/0004486 A1 Jan. 7, 2021

(51) Int. Cl.
| | | |
|---|---|---|
| *G06F 21/62* | (2013.01) | |
| *G06F 21/60* | (2013.01) | |
| *H04L 9/30* | (2006.01) | |
| *H04W 12/02* | (2009.01) | |

(52) U.S. Cl.
CPC ........ *G06F 21/6254* (2013.01); *G06F 21/604* (2013.01); *H04L 9/30* (2013.01); *H04W 12/02* (2013.01); *H04L 2209/80* (2013.01); *H04L 2209/84* (2013.01)

(58) Field of Classification Search
None
See application file for complete search history.

(56) References Cited

U.S. PATENT DOCUMENTS

| | | | |
|---|---|---|---|
| 7,917,771 B2 | 3/2011 | Forlenza et al. | |
| 9,288,184 B1 * | 3/2016 | Kvamme | H04L 63/02 |
| 10,108,306 B2 | 10/2018 | Khoo et al. | |
| 10,242,282 B2 | 3/2019 | Loce et al. | |
| 2003/0130893 A1 * | 7/2003 | Farmer | G06Q 30/0266 |
| | | | 705/14.63 |

(Continued)

FOREIGN PATENT DOCUMENTS

| | | | |
|---|---|---|---|
| CA | 3012889 A1 | 8/2017 | |
| WO | WO-2020205655 A1 * | 10/2020 | B60W 40/08 |

OTHER PUBLICATIONS

Patsakis, Constantinos et al., "Privacy-Aware Event Data Recorders: Cryptography Meets the Automotive Industry Again", IEEE Communications Magazine• Dec. 2013, pp. 122-128 (Year: 2013).*

(Continued)

*Primary Examiner* — Michael Pyzocha
(74) *Attorney, Agent, or Firm* — Trop, Pruner & Hu, P.C.

(57) ABSTRACT

As vehicles collect more data in autonomous or semi-autonomous operation, the collected data such as video, navigation and telemetry data, can containing personally identifiable information (PII). The PII may be governed by specific handling requirements or privacy policies. In order to comply with these requirements and policies a method, system and computer readable memory are provided for determining a location of a vehicle to enable determination of an enforcement policy associated with the location of the vehicle. The enforcement policy defines one or more PII objects that are to be filtered from the vehicle data. The PII objects contained within the vehicle data can then be filtered such that the PII objects are not identifiable. The filtered data can then be stored or transmitted to a remote location.

20 Claims, 5 Drawing Sheets

(56) References Cited

U.S. PATENT DOCUMENTS

| | | | |
|---|---|---|---|
| 2004/0146272 A1 | 7/2004 | Kessel et al. | |
| 2004/0267410 A1* | 12/2004 | Duri | G06F 21/6245 |
| | | | 701/1 |
| 2009/0025063 A1 | 1/2009 | Thomas | |
| 2009/0164878 A1 | 6/2009 | Cottrille | |
| 2009/0326791 A1* | 12/2009 | Horvitz | G08G 1/00 |
| | | | 701/119 |
| 2012/0005720 A1* | 1/2012 | McGloin | G06F 21/6263 |
| | | | 726/1 |
| 2013/0212659 A1* | 8/2013 | Maher | G05D 1/0022 |
| | | | 726/6 |
| 2013/0272523 A1 | 10/2013 | McCorkindale et al. | |
| 2014/0059694 A1* | 2/2014 | Lortz | H04L 63/12 |
| | | | 726/26 |
| 2014/0195100 A1* | 7/2014 | Lundsgaard | G06Q 50/30 |
| | | | 701/29.6 |
| 2015/0088335 A1* | 3/2015 | Lambert | H04L 67/10 |
| | | | 701/1 |
| 2015/0172056 A1* | 6/2015 | Meunier | H04L 9/0866 |
| | | | 380/28 |
| 2015/0178999 A1* | 6/2015 | Smith | H04W 4/60 |
| | | | 701/31.5 |
| 2015/0263860 A1* | 9/2015 | Leboeuf | H04W 12/08 |
| | | | 713/171 |
| 2015/0271666 A1* | 9/2015 | Arunachalam | H04L 63/20 |
| | | | 455/410 |
| 2016/0063278 A1* | 3/2016 | Kraska | G06F 21/602 |
| | | | 713/165 |
| 2016/0173882 A1* | 6/2016 | Mishra | H04N 19/136 |
| | | | 375/240.08 |
| 2016/0246996 A1 | 8/2016 | Khoo et al. | |
| 2018/0144148 A1* | 5/2018 | Rattan | H04L 9/0894 |
| 2019/0043354 A1* | 2/2019 | Oluwafemi | H04L 67/12 |
| 2019/0044728 A1* | 2/2019 | Karmoose | H04L 9/12 |
| 2019/0188814 A1* | 6/2019 | Kreitzer | G06Q 50/265 |
| 2019/0312778 A1* | 10/2019 | Netanel | H04L 67/12 |
| 2019/0378355 A1* | 12/2019 | Bruneel, II | G06F 21/6245 |
| 2020/0010093 A1* | 1/2020 | Li | G07C 5/008 |
| 2020/0082064 A1* | 3/2020 | Kurian | H04W 12/033 |
| 2020/0159942 A1* | 5/2020 | Nadler | H04L 9/3263 |
| 2020/0159955 A1* | 5/2020 | Barlik | G06F 21/604 |
| 2020/0175788 A1* | 6/2020 | Park | G07C 5/0816 |
| 2020/0242421 A1* | 7/2020 | Sobhany | G06K 9/6292 |
| 2020/0249675 A1* | 8/2020 | Kim | B60W 50/00 |
| 2020/0314587 A1* | 10/2020 | Gurin | G06Q 10/047 |
| 2020/0334581 A1* | 10/2020 | Skaling | H04W 12/033 |
| 2020/0334980 A1* | 10/2020 | Ludwig | G08G 1/127 |
| 2020/0366653 A1* | 11/2020 | Caceres | H04L 63/0853 |
| 2020/0401719 A1* | 12/2020 | Denker | H04L 63/10 |

OTHER PUBLICATIONS

Sah, Shagan et al.; "Video redaction: a survey and comparison of enabling technologies"; Journal of Electronic Imaging, 26(5), pp. 051405-051406-14, Sep./Oct. 2017.

AI Dash Cams; Samsara; retrieved on Aug. 20, 2019; retrieved from the internet: URL: https://www.samsara.com/ca/fleet/dash-cam.

"Dashcam Footage from Public Scheme to go Wales-wide"; https://www.bbc.com/news/uk-wales-40998946; BBC News; Aug. 21, 2017.

Axon Evidence.com User and Administrator Reference Guide [online]; version 2019.7; AXON; retrieved on Aug. 20, 2019; retrieved from the internet: URL: http://public.evidence.com/help/pdfs/latest/EVIDENCE.com+Administrator+Reference+Guide.pdf.

NextBase; retrieved on Aug. 20, 2019; retrieved from the internet: URL: https://www.nextbase.com/en-gb/national-dash-cam-safety-portal/.

Fletcher, Robson; "We could soon upload dashcam evidence directly to police, but are we ready for what it means?"; https://www.cbc.ca/news/canada/calgary/calgary-police-dashcam-online-upload-portal-consideration-1.4869356; CBC News, Oct. 22, 2018.

ZenduCAM; retrieved on Aug. 20, 2019; retrieved from the internet: URL: "ZenduCAM: HD Live Streaming Vehicle Incident Camera"; https://zenducam.com/?keyword=dash%20cams&gclid=Cj0KCQjwh6XmBRDRARIsAKNInDH8fRkB9N9w9YojwUx6dHzqV2z5pOsFT1gA0d0pjVJrErPAugCsikYaAqdeEALw_wcB.

European Search Report for European Application No. 20178620 dated Oct. 26, 2020.

\* cited by examiner

FILTERING PERSONALLY IDENTIFIABLE INFORMATION FROM VEHICLE DATA

TECHNICAL FIELD

The present disclosure relates to personally identifiable information in vehicle data and in particular, to filter personally identifiable information present in vehicle data acquired by a vehicle data collection system.

BACKGROUND

With cameras being more pervasive in vehicles for autonomous vehicles or dash cams, privacy is becoming a concern. Vehicle license plates and faces are captured in video images and are being uploaded to the cloud providing private information on other drivers including their image, speed, location and whom they are with. In addition, the vehicle may also capture data regarding the occupants of the vehicle, operating conditions of the vehicle and metadata associated with the surrounding environment, which the vehicle travels through.

In some cases this information may be required for insurance or law enforcement purposes such as in the case of an accident or a public emergency, however the majority of the time the information is not required and should be protected for the privacy of users on the road. Privacy regulations vary by country or region and can place different requirements on how personally identifiable information (PII) is handled. For example the General Data Protection Regulation (EU) 2016/679 ("GDPR") is an EU law on data protection and privacy for all individuals citizens of the European Union. In some cases, the data and images collected by vehicles may require protection to abide by privacy regulations such as GDPR. The privacy requirement may define how data is stored, where data is stored and who has access to the data. The use of redaction, or masking, in data, video and images has provided the ability to remove personally identifiable information (PII) such as license plates and faces; however, existing solutions are user dependent and may not comply with privacy regulations in regions where the data is collected and/or stored.

Accordingly, systems and methods that enable improved data filtering of personally identifiable information from vehicle data remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In accordance with an aspect of the present disclosure there is provided a method of filtering personally identifiable information (PII) objects from vehicle data, the method comprising: determining a location of a vehicle; retrieving an enforcement policy associated with the location of the vehicle defining one or more PII objects to be filtered from the vehicle data; filtering PII objects defined in the enforcement policy contained within the vehicle data such that the PII objects are not identifiable within the vehicle data; and storing the filtered vehicle data.

In accordance with another aspect of the present disclosure there is provided an in-vehicle data processing system of filtering personally identifiable information (PII) objects from vehicle data associated with a vehicle, the system comprising: a positioning device associated with the vehicle for determining a location of the vehicle; a memory containing instruction for filtering PII objects in the vehicle data; and a processor coupled to the memory, the positioning device and one or more sensors of the vehicle to process vehicle data from the one or more sensors, the processor for filtering PII objects within the vehicle data based upon an enforcement policy, the enforcement policy associated with a determined location of the vehicle.

In accordance with yet another aspect of the present disclosure there is provided a non-transitory computer readable memory containing instructions for filtering personally identifiable information (PII) objects from vehicle data, the instructions which when executed by a processor perform the method comprising: determining a location of a vehicle; retrieving an enforcement policy associated with the location of the vehicle defining one or more PII objects to be filtered from the vehicle data; filtering PII objects defined in the enforcement policy contained within the vehicle data such that the PII objects are not identifiable within the vehicle data; and storing the filtered vehicle data.

Embodiments are described below, by way of example only, with reference to FIGS. 1-5.

In order to manage PII data to protect people's privacy, and abide by law enforcement and insurance requests, a filter is provided within a in-vehicle data collection system to redact or mask private information taken by vehicle cameras or sensor associated with the vehicle. The PII data includes anything that would identify a person such as for example license plates and faces being the most common. The vehicle communicates with a central server which is maintained or associated with a regional governing body that sets the laws for that region. When a vehicle enters a geographical region, a PII enforcement policy is downloaded to the vehicle. The PII enforcement policy contains a set of public encryption keys, or identifies where to retrieve the encryption keys associated with the regional governing body (for example an encryption key for local police, provincial or state police, national police or government organizations) and a set of objects which are deemed to constitute PII (license plates, faces, telemetry, location etc.). This allows the data, images and video to be filtered to comply with privacy requirements by identifying content that is sensitive and should not be publically available while provided access to the original content when required by privacy regulations.

All data and video taken is be passed through a filter on the in-vehicle data collection system that "redacts" personable identifiable information/objects, as specified by the enforcement policy. The redacted objects can be encrypted with the public keys as specified by the enforcement policy. If an accident or public security event occurs, the police for example are able to retrieve the data and video and decrypt the redacted content.

Figure 1:
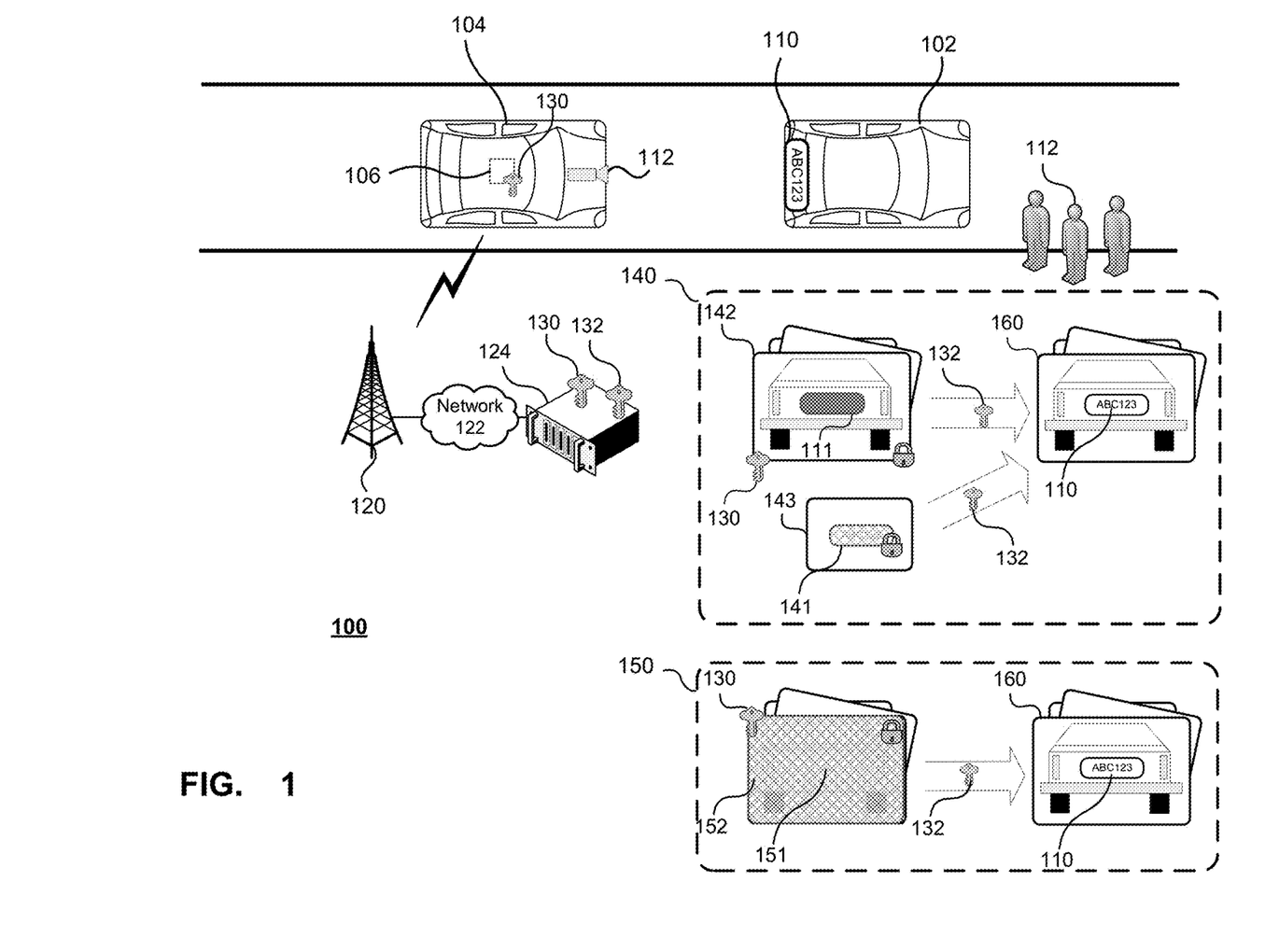
FIG. 1 shows a representation of vehicle data filtering.

The disclosed system enables the collection of vehicle images, video and data that is filtered to remove objects that are deemed sensitive but provide a means to which an authorized authority such as the police can retrieve the original data. FIG. 1 shows a representation of vehicle data redaction. A vehicle 104 can contain multiple sensors such as for example one or more cameras 112 which is connected to a processing unit of the in-vehicle data collection system 106. The processing unit may be part of autonomous or assisted vehicle system or dash cam type system. As the vehicle is driving data about the occupants, vehicle, and surroundings may be collected and stored on the vehicle or at a remote location. The collection of this data can include PII such as for example a license plate 110 of vehicle 102 or the images of people 112 present in the area. The collection of this data and mishandling may run afoul of privacy regulations if it is not handled correctly.

The processing of the data is performed on-board the vehicle by the in-vehicle data collection system 106 at the point or origination to ensure that any transmitted content is appropriately protected. The collection system uses an enforcement policy to determine what objects must be filtered or redacted and how the objects are obfuscated by the use of encryption key associated with an authority for the region in which the data is collected or stored. For example, a server 124 may provide the enforcement policy to the system 106 that can include a public encryption key 130 that is transmitted via one or more networks 122 coupled to a wireless network 120 to the data collection system 106. A private encryption key 132 would enable the authority to decrypt the content when required and can provide the appropriate checks and balances to ensure that the data is secure and not utilized inappropriately. Alternatively more than one encryption key can be used for encrypting filtered data. For example in a border situation between regions, for insurance, or different keys for different police organizations which operate within the same region.

As shown in block 140, the filtering or redaction of PII may be performed on individual objects within an image or video stream such as for example the license plate 110 to generate an image 142 using an encryption key 130 to generate a redacted 111 masked object 141. The object may be masked within the original image 142, or extracted to a separate file 143 containing the masked object 141 which can be encrypted and stored separately. The encryption process may utilize a two-step encryption process to encrypt the content. For example, a symmetric key, for example an Advance Encryption Standard (AES) key, is retrieved or generated and the content is encrypted with the symmetric key. The symmetric key can then be encrypted with one or more public keys (asymmetric) to provide better performance in the encryption process. The redaction can be reversed by using the private encryption key 132 to re-create the original object 110 in the image 160, or to extract a symmetric key to then decrypt the content. Alternatively, as shown in block 150, the entire image 152 may be encrypted 151 to obfuscate the content using the encryption key 130. The PII objects can then be permanently redacted from the data and saved, as a whole or separately if multiple authority policies or filters are being used, but provide a reference identifier to the original source data that has been encrypted.

Again, the original content may be accessible by the decryption key 132. The encrypted image 142, image 143 or image 152 can then be securely transmitted through a public network for storage while providing the appropriate handling of PII objects yet maintaining access to the source PII objects as required. Although the example provided is described in relation to objects within images, it should be understood that data generated within video, navigation, operation, network data or control of the vehicle may also contain sensitive content that may also be redacted as it may be defined as metadata associated with the images or video.

Figure 2:
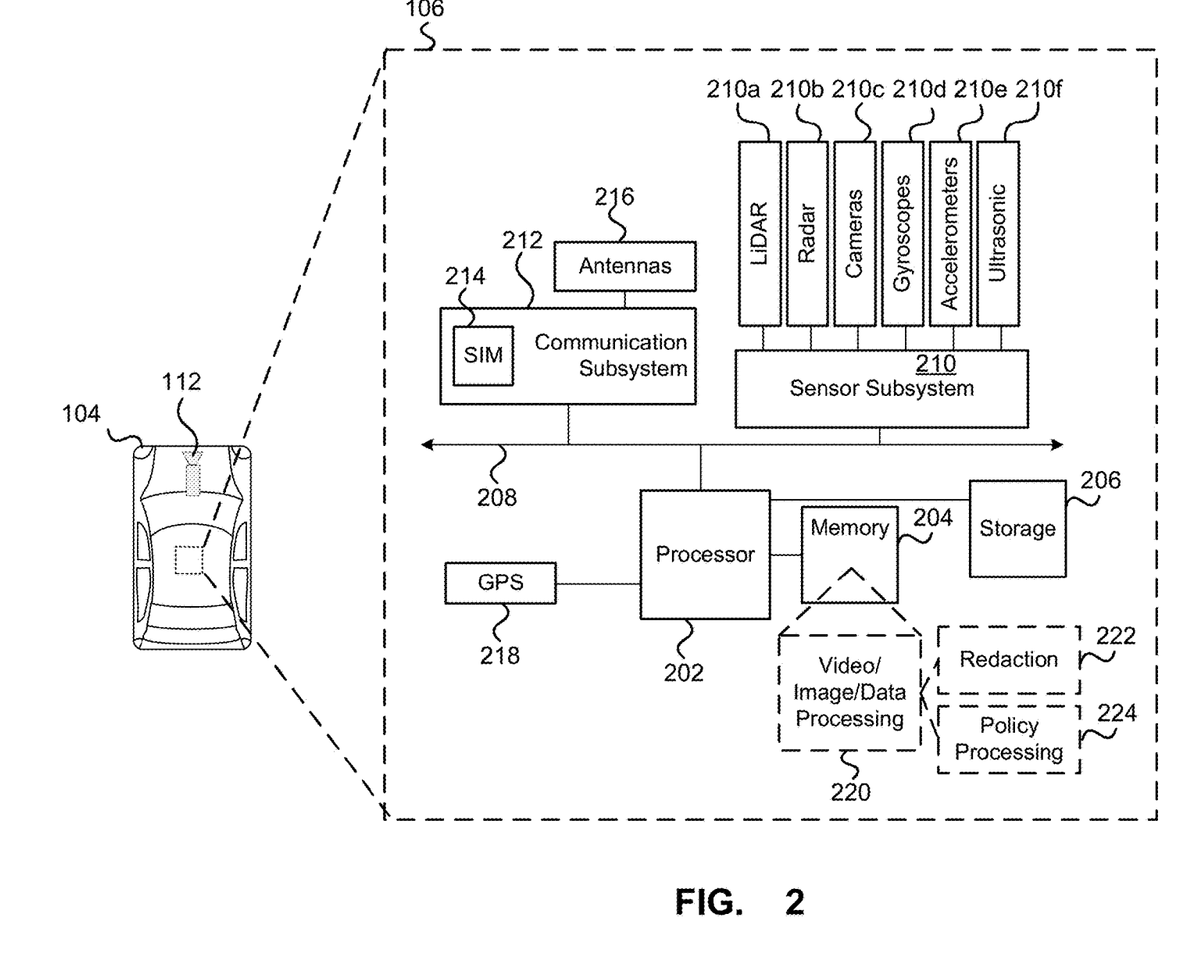
FIG. 2 shows a representation of an in-vehicle data collection system.

FIG. 2 shows a representation of an in-vehicle data collection system. The in-vehicle data collection system 106 may be provided by one or more subsystems of the vehicle or by a third-party device that is associated with the vehicle 104. The system 106 comprises one or more processors 202 that are coupled to a memory 204. The instructions stored in a storage component or device 206 are executed by the processor 202 from the memory 204. The instructions provide functionality for video/image/data processing 224 which provides for the filtering of PII objects 222 that are associated with an enforcement policy 224. The enforcement policy 224 is described in further detail in regards to FIG. 3. The processor 202 is coupled to one or more sensors 210a-210f of the vehicle 104 through a sensor subsystem 210. These sensors may include, but not be limited to, LiDAR 210a, radar 210b, one or more cameras 210c, gyroscopes 210d, accelerometers 210e or ultrasonic devices 210f. The data from these devices is collected by the processor 202 and processed using the functionality 220. The enforcement policy 224 is received through a communication subsystem 212 that may contain a system identity module (SIM) 214 via one or more antennas 216. The vehicle may utilize cellular or mobile networks to transmit and receive data. Alternatively, local area networks or short-range networks may be utilized to upload or download the data as required.

Figure 3:
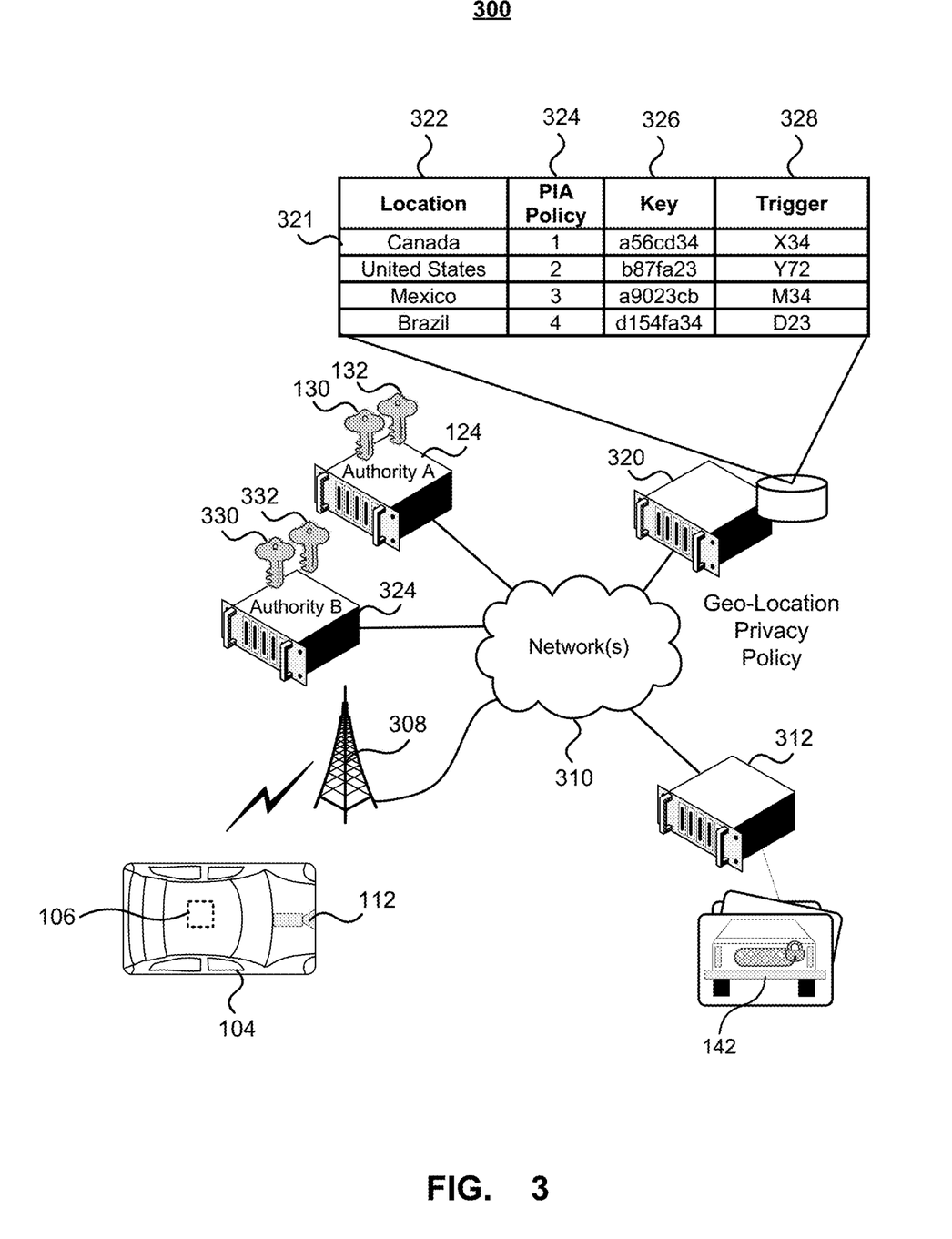
FIG. 3 shows a representation of a system of vehicle data filtering.

FIG. 3 shows a representation of a system 300 of vehicle data redaction. The system 300 shows an example of an enforcement policy 321 defines the region 322 to which enforcement policy is applicable. The example provides defines the region based upon a country, however small subdivisions or geographic coordinates can be utilized. The enforcement policy 321 can define the types of objects 324 or data that must be filtered or redacted within the contents and the means by which the data must be protected. For example, the entry '1' may define be associated with redacting only faces within an image. In addition, the encryption key 326, or a location of encryption key, may be provided within the enforcement policy. Triggers 328 may also be defined as to when data is to be filtered for example at the time of data collection, when the data is uploaded to the network, or when a trigger event associated with the vehicle occurs such as an accident, public alert or privacy identification sign is received requesting information from vehicles that are within a defined area. The trigger may alternatively define when filter is to occur in a particular region for example when a sign requesting PII be filtered is identified by a camera. The enforcement policy server 320 may contain policies associated with multiple regions or only be applicable to a region which in the vehicle is located. The vehicle 104 may request enforcement policy information when it changes regions from a primary enforcement policy server to a different enforcement policy server associated with the new region. The Authority A 124 and Authority B 324 will store the private decryption keys 132 and key 332 and may also store the public encryption keys 130 and key 330 respectively, or they may be provided to the enforcement server 320.

The enforcement policy 321 can also define where the filtered/redacted data 142 is to be stored on server 312. Alternatively, the redacted data or source data may be encrypted by a public key associated with a user or manufacturer of the in-vehicle data collection system 106 requiring an additional level of verification to decrypt the redacted PII data by the vehicle owner or manufacturer.

Figure 4:
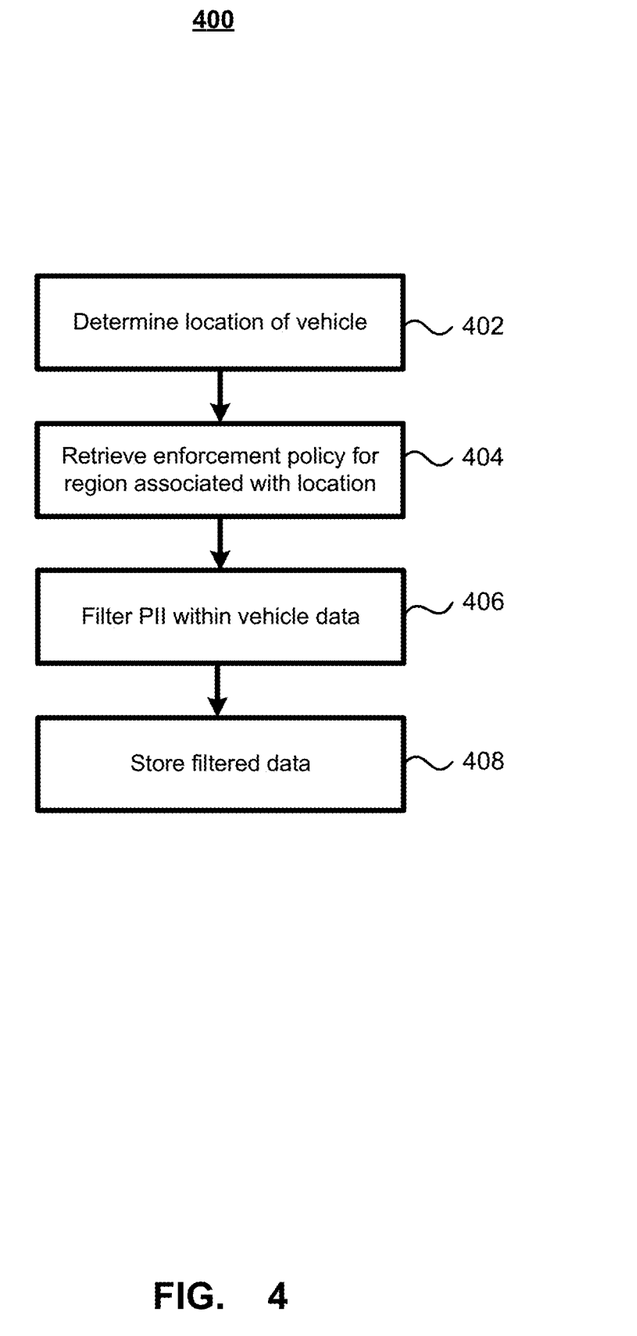
FIG. 4 shows a method of filtering personally identifiable data present in vehicle data acquired by a vehicle data collection system.

FIG. 4 shows a method of redacting PII objects from in-vehicle data. The location of the vehicle is determined (402) by a global positioning system (GPS) or an equivalent system such as Russian Global Navigation Satellite System (GLONASS), European Union Galileo, India's NAVIC, or Japan's Quasi-Zenith Satellite System (QZSS). Based upon the determined location a region can be determined which may be based upon a country, a province, state, or one or more defined geographic regions. Based upon the determined region an associated enforcement policy can be retrieved either locally from a memory on the device or remotely from a server coupled by the wireless network (404). PII present with in the data can then be filtered based upon the associated enforcement policy requirements for example objects such as license plates, faces and location data may be removed (406). The filtered data can then be stored either locally or remotely from the collection device (408). The redaction may occur as the data is collected or alternatively may occur when the data is uploaded and is removed from the device. A copy of the data may be encrypted and stored within the device prior to being filtered.

Figure 5:
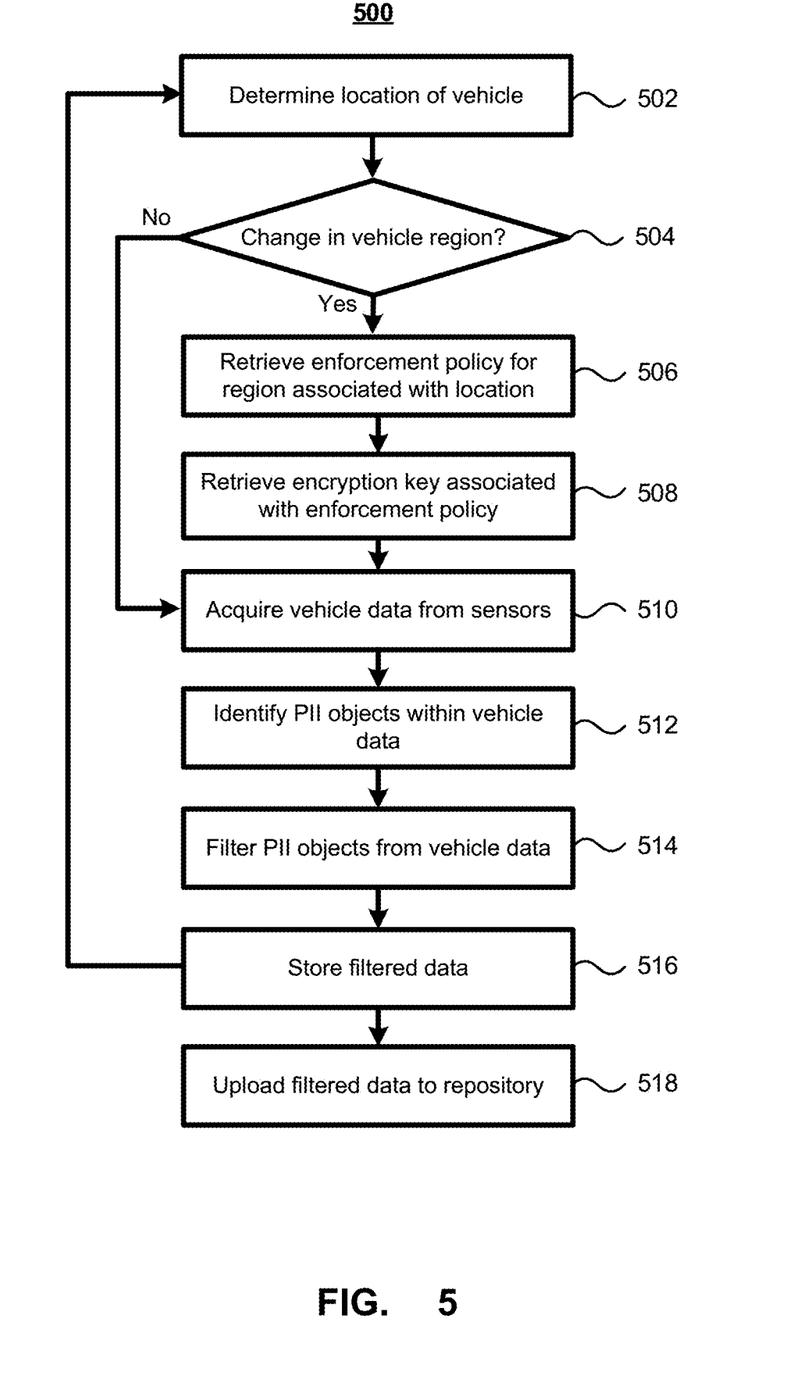
FIG. 5 shows an alternative method of filtering personally identifiable data present in vehicle data acquired by the vehicle.

As shown in FIG. 5, an alternative method of redacting personally identifiable data present in vehicle data acquired by the vehicle is provided. In the alternative method, the vehicle location is again determined (502) if a change in the event you call region is identified YES at (504) the privacy policy is retrieved for the region which is associated with in the location. The region may be determined by the vehicle through a lookup table or by requesting identification of the region by a remote server based upon location coordinates of the vehicle. The data from one or more of the vehicle sensors such as the camera can then be acquired (510). The enforcement policy can then be retrieved (506) and the encryption key associated with the privacy policy is also provided or retrieved (508). The encryption key can be used to encrypt the content, such a public encryption key, or alternatively a symmetric encryption key may be generated which is used to encrypt the content and a public encryption key may then be used to encrypt the symmetric encryption key. If a change in the region is not detected, (NO at 504) data acquisition continues (510). PII objects can then be identified within the vehicle data (512). The PII objects can then be filtered through redaction and or and/or encryption process (514). The filtering process encrypts the objects using the retrieved encryption key such that the original content cannot be identified. The filtering process may alternatively include multiple levels of filtering for PII objects. For example, different objects may require different levels of redaction or encryption and could only be accessible by particular authorities. For example, Authority A may have access to license plates objects while Authority B has access to faces of people thereby providing layers of redaction within the vehicle data. The objects can be independently encrypted using different encryption keys or redaction methods depending on the policy associated with the respective authority. The filtered data can then be stored locally (516) or uploaded to an external device, server or repository (518). The process of filtering the PII data may occur in real time as data is acquired, or only when the data is uploaded externally to the vehicle.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-5 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A method comprising:
   determining, by an in-vehicle processor in a vehicle, a location of the vehicle;
   retrieving, by the in-vehicle processor from among different enforcement policies, an enforcement policy associated with the determined location of the vehicle, the retrieved enforcement policy defining one or more personally identifiable information (PII) objects to be filtered from vehicle data collected at the vehicle, wherein the different enforcement policies defining PII objects to be filtered correspond to different vehicle locations, and each respective enforcement policy of the different enforcement policies contains:
      location information that defines a corresponding geographic region to which the respective enforcement policy is applicable,
      PII object information defining respective one or more PII objects to be filtered, and
      key information of an encryption key;
   retrieving, by the in-vehicle processor, an encryption key defined by the key information contained in the retrieved enforcement policy;
   filtering, by the in-vehicle processor, the vehicle data to mask a PII object contained within the vehicle data, the PII object that is masked being a PII object defined by the PII object information in the retrieved enforcement policy, wherein the filtering produces filtered vehicle data based on encrypting the PII object contained within the vehicle data using the encryption key defined by the key information contained in the retrieved enforcement policy; and
   sending, from the vehicle, the filtered vehicle data to a device external of the vehicle.

2. The method of claim 1, wherein each respective enforcement policy of the different enforcement policies further contains trigger information that defines a timing of when filtering of the one or more PII objects defined by the PII object information is to occur, and wherein the filtering of the vehicle data occurs at a time based on the trigger information of the retrieved enforcement policy.

3. The method of claim 1, further comprising:
   determining a change in location of the vehicle in relation to the determined location associated with the retrieved enforcement policy;
   retrieving, from among the different enforcement policies, a second enforcement policy corresponding to the changed location of the vehicle; and
   processing further vehicle data to filter a PII object in the further vehicle data based upon the second enforcement policy.

4. The method of claim 3, wherein the key information of the second enforcement policy specifies a second encryption key to use in masking the PII object in the further vehicle data.

5. The method of claim 1, wherein the vehicle data comprises one or more of images, video, telemetry, occupant information, and position data of the vehicle.

6. The method of claim 1, wherein the filtering comprises one of:
including the masked PII object in the vehicle data, or
producing a separate file containing the masked PII object.

7. The method of claim 1, wherein retrieving the enforcement policy comprises downloading, based on the determined location, the enforcement policy from an external source over a communication network.

8. The method of claim 1, wherein the different enforcement policies correspond to different government organizations at different geographic regions.

9. The method of claim 1, wherein the retrieved enforcement policy identifies a geographic region to which the retrieved enforcement policy is applicable.

10. A vehicle comprising:
a positioning device associated with the vehicle for determining a location of the vehicle;
a processor; and
a non-transitory storage medium storing instructions executable on the processor to:
retrieve, at the vehicle from among different enforcement policies, an enforcement policy associated with the determined location of the vehicle, the retrieved enforcement policy defining one or more personally identifiable information (PII) objects to be filtered from vehicle data collected at the vehicle, wherein the different enforcement policies define PII objects to be filtered and correspond to different vehicle locations, and each respective enforcement policy of the different enforcement policies contains:
location information that defines a corresponding geographic region to which the respective enforcement policy is applicable,
PII object information defining respective one or more PII objects to be filtered, and
key information of an encryption key;
retrieve, at the vehicle, an encryption key defined by the key information contained in the retrieved enforcement policy;
filter, at the vehicle, the vehicle data to mask a PII object contained within the vehicle data, the PII object that is masked being a PII object defined by the PII object information in the retrieved enforcement policy, wherein the filtering produces filtered vehicle data based on encrypting the PII object contained within the vehicle data using the encryption key defined by the key information contained in the retrieved enforcement policy; and
send, from the vehicle, the filtered vehicle data to a device external of the vehicle.

11. The vehicle of claim 10, wherein the instructions are executable on the processor to:
determine a change in location of the vehicle in relation to the determined location associated with the retrieved enforcement policy;
retrieve, from among the different enforcement policies, a second enforcement policy corresponding to the changed location of the vehicle; and
process further vehicle data to filter a PII object in the further vehicle data based upon the second enforcement policy.

12. The vehicle of claim 11, wherein the key information of the second enforcement policy specifies a second encryption key to use in masking the PII object in the further vehicle data.

13. The vehicle of claim 10, wherein the vehicle data comprises one or more of images, video, telemetry, occupant information, and position data of the vehicle.

14. The vehicle of claim 10, wherein the filtering comprises one of:
including the masked PII object in the vehicle data, or
producing a separate file containing the masked PII object.

15. The vehicle of claim 10, wherein the PII object comprises one or more of a vehicle identification, a face, and an address within captured video in the vehicle data.

16. The vehicle of claim 10, wherein the instructions are executable on the processor to:
download, based on the determined location, the enforcement policy from an external source over a communication network.

17. The vehicle of claim 10, wherein the different enforcement policies correspond to different government organizations at different geographic regions.

18. The vehicle of claim 10, wherein each respective enforcement policy of the different enforcement policies further contains trigger information that defines a timing of when filtering of the one or more PII objects defined by the PII object information is to occur, and wherein the filtering of the vehicle data occurs at a time based on the trigger information of the retrieved enforcement policy.

19. A non-transitory computer readable storage medium comprising instructions which when executed cause a processor in a vehicle to:
determine a location of the vehicle;
retrieve, at the vehicle from among different enforcement policies, an enforcement policy associated with the determined location of the vehicle, the retrieved enforcement policy defining one or more PII objects to be filtered from vehicle data collected at the vehicle, wherein the different enforcement policies define PII objects to be filtered and correspond to different vehicle locations, and each respective enforcement policy of the different enforcement policies contains:
location information that defines a corresponding geographic region to which the enforcement policy is applicable,
PII object information defining respective one or more PII objects to be filtered, and
key information of an encryption key;
retrieve, at the vehicle, an encryption key defined by the key information contained in the retrieved enforcement policy;
filter, at the vehicle, the vehicle data to mask a PII object contained within the vehicle data, the PII object that is masked being a PII object defined by the PII object information in the retrieved enforcement policy, wherein the filtering produces filtered vehicle data based on encrypting the PII object contained within the vehicle data using the encryption key defined by the key information contained in the retrieved enforcement policy; and
send, from the vehicle, the filtered vehicle data to a device external of the vehicle.

20. The non-transitory computer readable storage medium of claim 19, wherein each respective enforcement policy of the different enforcement policies further contains trigger information that defines a timing of when filtering of the one or more PII objects defined by the PII object information is to occur, and wherein the filtering of the vehicle data occurs at a time based on the trigger information of the retrieved enforcement policy.

\* \* \* \* \*